United States Patent
Aydin et al.

(10) Patent No.: US 12,163,291 B2
(45) Date of Patent: Dec. 10, 2024

(54) FLUOROCARBON-FREE AND BIO-BASED OIL AND WATER BARRIER MATERIALS COMPRISING POLYELECTROLYTE COMPLEXES

(71) Applicant: ORGANOCLICK AB, Täby (SE)

(72) Inventors: Juhanes Aydin, Södertälje (SE); Maria Wennman, Täby (SE)

(73) Assignee: ORGANOCLICK AB, Taby (SE)

( * ) Notice: Subject to any disclaimer, the term of this patent is extended or adjusted under 35 U.S.C. 154(b) by 105 days.

(21) Appl. No.: 17/762,110

(22) PCT Filed: Oct. 20, 2020

(86) PCT No.: PCT/SE2020/051003
§ 371 (c)(1),
(2) Date: Mar. 21, 2022

(87) PCT Pub. No.: WO2021/086247
PCT Pub. Date: May 6, 2021

(65) Prior Publication Data
US 2022/0356652 A1  Nov. 10, 2022

(30) Foreign Application Priority Data

Oct. 31, 2019 (SE) .................... 1951246-6

(51) Int. Cl.
| | | |
|---|---|---|
| D21H 21/16 | (2006.01) | |
| C09D 103/02 | (2006.01) | |
| D06M 15/05 | (2006.01) | |
| D06M 15/11 | (2006.01) | |
| D06N 3/02 | (2006.01) | |
| D21H 17/23 | (2006.01) | |
| D21H 17/28 | (2006.01) | |
| D21H 17/30 | (2006.01) | |
| D21H 17/31 | (2006.01) | |

(52) U.S. Cl.
CPC .......... *D21H 21/16* (2013.01); *C09D 103/02* (2013.01); *D06M 15/05* (2013.01); *D06M 15/11* (2013.01); *D06N 3/02* (2013.01); *D21H 17/23* (2013.01); *D21H 17/28* (2013.01); *D21H 17/30* (2013.01); *D21H 17/31* (2013.01); *D06M 2200/11* (2013.01); *D06M 2200/12* (2013.01); *D06N 2209/142* (2013.01); *D06N 2209/145* (2013.01)

(58) Field of Classification Search
None
See application file for complete search history.

(56) References Cited

U.S. PATENT DOCUMENTS

| | | | |
|---|---|---|---|
| 6,060,410 A | 5/2000 | Gillberg-Laforce et al. | |
| 8,747,955 B2 | 6/2014 | Cimpeanu et al. | |
| 2011/0143156 A1 | 6/2011 | Cimpeanu et al. | |
| 2011/0236450 A1 | 9/2011 | Scheuing et al. | |
| 2011/0236582 A1* | 9/2011 | Scheuing | A01N 33/12 524/543 |
| 2011/0293957 A1 | 12/2011 | Johansson et al. | |
| 2018/0135252 A1 | 5/2018 | Pang et al. | |
| 2018/0171559 A1 | 6/2018 | Hipps, Sr. et al. | |

FOREIGN PATENT DOCUMENTS

| | | |
|---|---|---|
| CN | 102333829 A | 1/2012 |
| CN | 109056409 A | 12/2018 |
| CN | 109963983 A | 7/2019 |
| CN | 110088400 A | 8/2019 |
| EP | 1918456 A1 | 5/2008 |
| JP | 9-239903 A | 9/1997 |
| JP | 2001-64440 A | 3/2001 |
| JP | 2019-526716 A | 9/2019 |
| JP | 2019-526717 A | 9/2019 |
| JP | 2019-532189 A | 11/2019 |
| SE | 1651138 A1 | 2/2018 |
| WO | 2010/037906 A1 | 4/2010 |
| WO | 2015/119891 A1 | 8/2015 |
| WO | 2018/038671 A1 | 3/2018 |
| WO | 2019/180302 A1 | 9/2019 |

OTHER PUBLICATIONS

Supplementary Search Report from corresponding European Application No. 20883251 dated Sep. 14, 2023.
Alimohammadzadeh, R. et al., Sustainable Surface Engineering of Lignocellulose and Cellulose by Synergistic Combination of Metal-Free Catalysis and Polyelectrolyte Complexes, Global Challenges, vol. 3, No. 1900018, pp. 1-5 (online Jun. 6, 2019).
Chi, Kai et al., Sustainable Development of Polysaccharide Polyelectrolyte Complexes as Eco-Friendly Barrier Materials for Packaging Applications, Green Polymer Chemistry: New Products, Processes, and Applications, ACS Symposium Series, vol. 1310, Chapter 8, pp. 109-123 (Nov. 26, 2018).
Office Action and Search Report from corresponding Chinese Application No. 202080072858.2 dated Nov. 16, 2022, with English Translation.
Basu, Snehasish et al., Sustainable barrier materials based on polysaccharide polyelectrolyte complexes, Green Chemistry, vol. 19, pp. 4080-4092 (2017).

(Continued)

*Primary Examiner* — Dennis R Cordray
(74) *Attorney, Agent, or Firm* — Porter Wright Morris & Arthur LLP

(57) ABSTRACT

The present invention relates generally to compositions comprising polyelectrolytes complexes (PECs) of anionic and cationic biopolymers capable of forming barriers on fiber based materials. Also disclosed is a fibre based material with a barrier coating against oil and water, wherein the material is provided with a barrier from at least two layers formed from at least one composition comprising a polyelectrolyte complex (PEC) of a cationic biopolymer and an anionic biopolymer, The two layers result in improvements in both oil resistance and water resistance compared to the same material provided with a single layer of said at least one composition.

17 Claims, No Drawings

(56) References Cited

OTHER PUBLICATIONS

Chi, Kai et al., Improved eco-friendly barrier materials based on crystalline nanocellulose/chitosan/carboxymethyl cellulose polyelectrolyte complexes, Food Hydrocolloids, vol. 80, pp. 195-205 (2018).

Schnell, Carla N. et al., Films from xylan/chitosan complexes: preparation and characterization, Cellulose, vol. 24, pp. 4393-4403 (2017).

Office Action dated Aug. 20, 2024 from corresponding Japanese Application No. 2022-523439, with English Translation.

* cited by examiner

FLUOROCARBON-FREE AND BIO-BASED OIL AND WATER BARRIER MATERIALS COMPRISING POLYELECTROLYTE COMPLEXES

TECHNICAL FIELD

The present invention relates generally to compositions comprising polyelectrolytes complexes (PECs) of anionic and cationic biopolymers capable of forming barriers on fiber based materials.

BACKGROUND OF THE INVENTION

In order to increase oil and water resistance on fibre-based materials (create an oil and water barrier), for example papers for paper packaging, it is common to coat these with different polymeric materials. Today, almost exclusively polymers from fossil sources are used such as polyethylene. In some cases, plastic is also used in combination with aluminium foil to get stronger barriers. Fluorocarbons are also very efficient chemicals in making fibrous materials oil and water repellent but more and more fluorinated compounds are banned all over the world due to their toxicity and bioaccumulation. Today the packaging industry/paper industry, amongst others, is seeking for new sustainable solutions to create oil and water barriers which meet the standard of being non-toxic, bio-based and biodegradable.

As awareness of and demand for bio-based materials increase, interest in finding substitutes for the fossil-based barriers also increases. In the food industry it is particularly important to find bio-based substitutes for conventional barriers, since there is a special focus on the recyclability of the packaging material. Also, the packaging industry has a demand for biodegradable barriers since compostability is a major challenge for single use items.

PECs are the association complexes formed between oppositely charged particles such as polymer-polymer, polymer-drug and polymer-drug-polymer. These complexes are formed due to electrostatic interactions between oppositely charged polyions and thereby avoid the use of chemical cross linking agents. Based on origin polyelectrolytes are classified as natural, synthetic and chemically modified biopolymers.

WO 2015/119891 describes a method of producing a rough coating to be used, for instance, to decrease the viscous drag of a coated article. The coating comprises a polyelectrolyte complex of at least one cationic polyelectrolyte an at least one anionic polyelectrolyte. However, the coating described in this document is not to be considered as a barrier against oil and water.

Schnell, C. et al. "Films from xylan/chitosan complexes: preparation and characterization", Cellulose, 2017, vol. 24, pp. 4393-4403, a barrier formed from a cationic polyelectrolyte complex comprising xylan and chitosan is disclosed. The disclosed barrier exhibits water vapor and oxygen barrier properties. It would however, be advantageous to provide a barrier composition also exhibiting barrier properties against fatty compounds such as oil.

U.S. Pat. No. 8,747,955 discloses methods of producing food packaging with fat barrier by means of coatings comprising a polyelectrolyte complex from anionic and cationic polymers, such as synthetic polyacrylates and polyacids. It would however, be advantageous to find suitable biobased materials that could form similarly useful barrier coatings from polyelectrolyte compositions.

WO 2018/038671 describes compositions of polyelectrolyte complexes from biobased oppositely charged polymers that are useful as binders for fiber based materials, textiles, woven and nonwoven materials and induce improvements in material strength.

Chi, K & Catchmark, M. "Improved eco-friendly barrier materials based on crystalline nanocellulose/chitosan/carboxymethyl cellulose polyelectrolyte complexes", Food Hydrocolloids, 2018, vol. 80, pp. 195-205, discloses a fiber based material with a single layer barrier coating against oil and water. Said barrier is formed from a composition of polyelectrolyte complexes from a cationic biopolymer and an anionic biopolymer.

It would be desirable to further develop PEC compositions derived from biobased charged polymers to obtain compositions that can be used to obtain controlled barriers of biodegradable fiber materials, both for fats, grease or oils and for water based systems, especially, but not limited to, for the purpose of protecting food products. For a person skilled in the art it is obvious from common knowledge that a water and oil repellent barrier material is also useful for dirt repellency where applicable. It is also further understood that an increase in oxygen barrier is achieved with these kinds of barrier materials.

For many reasons, it is desirable to use starch and, specifically to use cationic starch for creating a sustainable highly efficient barrier for oil and water. The invention as follows derives from a general knowledge that polyelectrolyte complex (PEC) may bring synergistic effects from cationic and anionic polymers in various contexts.

SUMMARY OF INVENTION

It is a general object of the invention to use hydrophilic biomaterials to form barrier structures useful against both oily products and water or water based products.

It is an object of the invention to provide compositions of hydrophilic biomaterials that can form several layers on fiber based materials so that the layers can act synergistically to improve both oil and water barrier capacity of the material with its applied layers.

It is a specific object of the present invention to provide fiber based materials with an oil and water barrier from compositions of a biodegradable polyelectrolyte complex from cationic and anionic biopolymers comprising only components and additives generally approved to be used in food contact.

It is also an object of the present invention to obtain oil and water barriers with controlled tackiness of the applied barriers and thereby high resistance to disintegration or dissolution of the barrier, while still controlling heat-sealing ability.

In one general first aspect, the invention is directed to a fiber based material with a barrier coating against oil and water, wherein the material is provided with a barrier from at least two layers formed from at least one composition comprising a polyelectrolyte complex (PEC) of a cationic biopolymer and an anionic biopolymer. The presence of the two layers is synergistic and results in improvements in both oil resistance and water resistance compared to the same material provided with a single layer of said at least one composition. Preferably, each of the two layers has a lower add-on when applied to the fibre based material (in $g/m^2$) from the least one composition than the add-on of an applied single layer of said at least one composition-.

The meaning of the term improvements in this aspect is that for the material, an increase in oil and water resistance shall be significant and observable with standard tests, such as the KIT test according to T 999 pm-96 for oil and the COBB method according to ISO 536:191(E) for water.

A fiber based material in the meaning of the present application may generally comprise synthetic or biofibers such as fibers of celluloses, polymer fibers or mixtures thereof included in various types of paper, paperboard, corrugated board, paper for packaging, other specialty papers, containers, molded pulp or other uses, cardboards, textiles and both woven and nonwoven material including but not limited to airlaid, drylaid, spunbond, spunlace, wetlace, meltblown and wetlaid nonwovens.

An oil or grease barrier in the context of the present invention has the meaning of repellency or antiwicking properties of a material towards oil, grease, fat or other lipophilic agents or organic solvents, such as commonly used with KIT tests. Many such tests are well known to the skilled persons for example in applied paper technology and a non-limiting example is TAPPI T559 for grease resistance.

In one aspect of the invention, the PEC of at least one composition includes a cationic biopolymer selected from cationic starch (CS) and/or chitosan and an anionic biopolymer selected from at least one of lignin alkali, lignosulfonic acid, or a polysaccharide, especially sodium carboxymethyl cellulose (CMC), alginic acid, pectin, carrageenan, gum arabic, hemicellulose, xanthan gum, and nanocrystalline cellulose (NCC), wherein alginic acid and lignosulfonic acid preferably are present as their sodium salts.

In one aspect of the invention, the material comprises a barrier comprising two layers formed from two compositions comprising a polyelectrolyte complex (PEC) of CS and CMC. The two compositions can comprise 0.1 to 20% (w/w) of CMC, and 0.1 to 20% of CS, preferably 0.5 to 10% (w/w) of CMC, and 0.5 to 20% of CS.

In one aspect of the invention, at least one composition of the multi-layer barrier, has a defined pH and comprises a pH-adjuster selected from an acid, a buffering system and a base. According to this aspect the acid is one or more of an organic or inorganic acid. The organic acid is selected from one or more of acetic acid, acetylsalicylic acid, adipic acid, ascorbic acid, aspartic acid, benzenesulfonic acid, camphorsulfonic acid, citric acid, dihydroxy fumaric acid, esylic acid formic acid, glycolic acid, glutamic acid glyoxylic acid, hydrochloric acid, lactic acid, malic acid, malonic acid, maleic acid, mandelic acid, mesylic acid, oxalic acid, paratoluenesulfonic acid, pentanoic acid, phtalic acid, propionic acid, pyruvic acid, salicylic acid, sulfuric acid, tartaric acid, triflic acid, any amino acids, levulinic acid and succinic acid. The inorganic acid, for example, is a mineral acid selected from any of hydrogen halides: hydrochloric acid (HCl), hydrobromic acid (HBr), hydroiodic acid (HI) or the halogen oxoacids: hypochloric acid, chloric acid, perchloric acid, periodic acid and corresponding compounds for bromine and iodine, or from any of sulfuric acid (H2SO4), sulphamic acid, fluorosulfuric acid, nitric acid (HNO3), phosphoric acid (H3PO4), fluoroantimonic acid, fluoroboric acid, hexafluorophosphoric acid, chromic acid (H2CrO4) or boric acid (H3BO3). Preferably, the acid is present in the layer forming compositions in an amount of 0.01 to 30% (w/w), preferably the acid is selected from citric acid, lactic acid, oxalic acid and tartaric acid, more preferably the acid is 5 to 15% (w/w) of citric acid and/or lactic acid. The acid preferably results in pH of 2 to 4.

The pH-adjuster of the previous aspect of the invention can be a buffering system so at least one composition comprises 0.01 to 30% (w/w) of an acid and a base pair, preferably a corresponding acid and base pair admitting a pH between 2 and 9, more preferably 1 to 15% (w/w) of said and a base pair. In one embodiment, the composition comprises 1 to 10% (w/w) citric acid and 1 to 10% (w/w) tribasic citrate, preferably in equal amounts.

The pH-adjuster of the previous aspect of the invention can alternatively be a base, preferably the base is sodium hydrogen carbonate (NaHCO$_3$), preferably providing a pH of 8 to 9.

In one aspect of the invention, the two compositions comprise PECs with the same relative amounts of CS and CMC; i.e. CS and CMC is present in the two compositions at the same % (wt).

In one aspect of the invention, at least one of the compositions of the multi-layer barrier, comprises a plasticizer, preferably the plasticizer is a polyol type plasticizer, more preferably the plasticizer is glycerol and/or sorbitol present in amount of 1 to 20% (w/w).

In one aspect of the invention, at least one of the compositions of the multi-layer barrier, comprises an additive selected from ammonium zirconium carbonate; preservatives; defoamers; foaming agents, wetting agents; coalescent agents; catalysts; surfactants; emulsifiers; cross-linkers; wet strength additives such as epichlorohydrin, rheology modifiers; fillers; nonionic polymers; dyes and pigments.

In one aspect of the invention, the material has a barrier from at least two applied layers having a KIT value of 5 or more, as measured according to T 999 pm-96 and COBB60 value of 50 or less, as measured according to ISO 536:191 (E).

In one aspect of the invention, the material has a barrier wherein a first layer is made from a composition with a first pH value and a second layer is made from a composition having a second pH value, preferably the second layer is made from a composition having a lower pH value than the composition providing the first layer. In one embodiment, the composition for the first layer comprises a buffering system according to what is outlined above, and the composition for the second layer comprises an acid according to what is outlined above. In another specific embodiment, the first layer is made from a composition having a pH value of 3 to 6, comprising 5 to 20% (w/w) of CS, 1 to 5% (w/w) of CMC and a buffering system, comprising an acid and base pair selected from citric acid and a corresponding carboxylate of citric acid; and lactic acid and a corresponding carboxylate of lactic acid and the second layer is made from a composition having a pH value of 2 to 3, comprising 5 to 20% (w/w) of CS, 1 to 5% (w/w) of CMC and an acid selected from citric acid and lactic acid. The first and second layer are for example made from two compositions having the same relative amount in (w/w) of CS and CMC. In one example of this embodiment, the first layer forming composition comprises 5 to 15% (w/w) of citric acid and tribasic citrate a second layer forming composition comprises 5 to 15% (w/w) of citric acid. Preferably, according to this embodiment, the first layer is the inner layer of the barrier and said second layer is outer layer of the barrier.

In one aspect of the invention, the PEC of at least one composition has charge ratio that is ≤1. The charge ratio represents the overall charge of the PEC formed from a cationic and an anionic biopolymer, and is further defined in the exemplifying part of this specification.

In other aspects of the invention, the PEC of at least one composition has charge ratio that is about 1 or above 1. The skilled person can select the relationship between cationic and ionic biopolymers to obtain a close to neutral net charge or anionic charge of the PEC, For example the concentration of the anionic biopolymer CMC can be increased in relation to the cationic biopolymer, as exemplified by CS, It would also be feasible to select different brands of cationic biopolymer with different charge densities in order to control the charge ratio of the resulting PECs. The following detailed and exemplifying part of the invention gives further guidance to the skilled parson to control charge densities of the inventive PEC compositions.

In one aspect of the invention, the material has a barrier comprising at least one layer formed from at least one composition comprising a polyelectrolyte complex (PEC) of a cationic biopolymer and an anionic biopolymer and at least one layer comprising an amino-functional siloxane, or a layer comprising a hydrophobic agent, such as a wax. Suitable compositions for forming layers comprising an amino-functional siloxane are the emulsified compositions disclosed in WO2018/048342 (hereby incorporated as a reference) to which conventional layer forming additives optionally can be added. Suitable acidic emulsion compositions comprising an amino-functional siloxane, a hydrolysable alkylsilane and water, for a layer comprising a hydrophobic material can be found in WO2018/038670 (hereby incorporated as a reference). Such compositions comprise PECs from cationic and anionic biopolymers with a charge ratio that is ≤1 and one more fatty compounds selected from oils, waxes and other lipid or hydrophobic agents. In one embodiment of this aspect, the material comprises a barrier with two layers as outlined anywhere above and an additional layer comprising the now described amino-functional siloxane, or the layer comprising a hydrophobic agent According to another aspect, the present invention relates to an aqueous polyelectrolyte (PEC) composition for application to a fibre based material for the use of obtaining a barrier coating resistant to oil and water, wherein the composition comprises: (a) 0.1 to 20% (w/w) of CMC and 0.1 to 20% of CS, preferably 0.5 to 10% (w/w) of CMC, and 0.5 to 20% of CS, providing PECs with a charge ratio of ≤1; (b) 1 to 20% (w/w) of a plasticizer, preferably sorbitol; and (c) 1 to 15% (w/w) of a pH adjusting agent selected from an acid, buffering system and a base.

In one embodiment, the composition comprises 5 to 20% (w/w) of CS, 1 to 5% (w/w) of CMC, and 1 to 15% (w/w) of a buffering system consisting of an acid and base pair, preferably a corresponding acid and base pair derived from an organic acid, more preferably the buffering system is selected from citric acid/corresponding carboxylate of citric acid and lactic acid/corresponding carboxylate of lactic acid. Preferably the composition has a pH of 3 to 6. Also preferably, the composition comprises equal amounts (w/w) of citric acid and tribasic citrate.

In another embodiment, the composition comprises 5 to 20% (w/w) of CS, 1 to 5% (w/w) of CMC, and an organic or inorganic acid providing the composition with a pH of 1 to 3, preferably the acid is present in an amount of 0.01 to 30% (w/w), more preferably the acid is selected from citric acid, lactic acid, oxalic acid and tartaric acid, more preferably the acid is 5 to 15% (w/w) of citric acid and/or lactic acid.

In yet another embodiment, the composition comprises 5 to 20% (w/w) of CS, 1 to 5% (w/w) of CMC, and a base providing the composition with pH of 8 to 9, preferably the base is sodium hydrogen carbonate (NaHCO$_3$).

The so embodied compositions can further comprise an additive selected from ammonium zirconium carbonate; preservatives; defoamers; foaming agents, wetting agents; coalescent agents; catalysts; surfactants; emulsifiers; cross-linkers; rheology modifiers; fillers; nonionic polymers; dyes and pigments.

Yet another aspect of the invention relates to a kit with at least two compositions comprising: (a) 0.1 to 20% (w/w) of CMC and 0.1 to 20% of CS, preferably 0.5 to 10% (w/w) of CMC, and 5 to 20% of CS, providing PECs with a charge ratio of ≤1; (b) 1 to 20% (w/w) of a plasticizer, preferably sorbitol; and (c) 1 to 15% (w/w) of a pH adjusting agent selected from an acid, buffering system and a base. The kit is useful for forming barriers on a fiber based material and obtaining a barrier coating resistant to oil and water, said comprising a first compartment comprising a first composition with a buffering system and a second compartment with a second composition comprising an acid with a pH, lower than the first composition. The first composition can comprise 5 to 20% (w/w) of CS, 1 to 5% (w/w) of CMC, and 1 to 15% (w/w) of a buffering system consisting of an acid and base pair, preferably a corresponding acid and base pair derived from an organic acid, more preferably the buffering system is selected from citric acid and a corresponding carboxylate of citric acid; and lactic acid and a corresponding carboxylate of lactic acid, and even more preferably the composition comprises equal amounts (w/w) of citric acid and tribasic citrate and has a pH of 3 to 6. The second composition can comprise 5 to 20% (w/w) of CS, 1 to 5% (w/w) of CMC, and an organic or inorganic acid providing the composition with a pH of 1 to 3, preferably the acid is present in an amount of 0.01 to 30% (w/w), preferably the acid is selected from citric acid, lactic acid, oxalic acid and tartaric acid, more preferably the acid is 5 to 15% (w/w) of citric acid and/or lactic acid.

The so described kit with at least two compositions according to the invention is generally assembled in order to keep the compositions separated throughout shipping and storage and support convenient industrial application of the compositions in order to manufacture the invented materials with improved barriers. For this purpose, the compositions are stored separately in different compartments of the kit which can be conventional or suitable separate containers available to a skilled person. The kit may also comprise a user's manual in order to support application or manufacturing methods as outlined in the following section of the description.

In still yet another aspect, the invention relates to a method of manufacturing the material according to any aspect or embodiment previously disclosed, comprising the steps of applying a first layer to the material with a composition comprising a polyelectrolyte complex (PEC) of a cationic biopolymer and an anionic biopolymer; optionally drying the material at a temperature between 15 and 90° C. until essentially dry; followed by applying a second layer to the first layer with a second composition or the same composition again; and optionally curing the material. In one embodiment curing is performed at 20° C. to 200° C., more preferably at 50° C. to 200° C., most preferably at 90° C. to 180° C.

The method can be performed by applying the first and second composition with at least one of the following process technologies; spraying, roll coating; foulard coating; dip coating; screen coating; padding, impregnation, or using a size press; a direct coating method including knife coating, blade coating, wire wound bar coating, round bar coating and crushed foam coating; and an indirect coating methods including mayer rod coating, direct roll coating, kiss coating, gravure coating and reverse roll coating; preferably the application is performed with roll coating or foulard coating.

In one embodiment of the invention, the method is performed in which the second composition applied is the same as the first composition.

In another embodiment of the invention, the first composition has a different pH than the second composition. Preferably, the first composition has a higher pH than the second composition. Also preferably, the first composition comprises 5 to 20% (w/w) of CS, 1 to 5% (w/w) of CMC, and 1 to 15% (w/w) of a buffering system consisting of an acid and base pair, preferably a corresponding acid and base pair derived from an organic acid, more preferably the buffering system is selected from citric acid and a corresponding carboxylate of citric acid; and lactic acid and a corresponding carboxylate of lactic acid, and even more preferably the composition comprises equal amounts (w/w) of citric acid and tribasic citrate and has a pH of 3 to 6. Also preferably, the second composition comprises 5 to 20% (w/w) of CS, 1 to 5% (w/w) of CMC, and an organic or inorganic acid providing the composition with a pH of 1 to 3, preferably the acid is present in an amount of 0.01 to 30% (w/w), preferably the acid is selected from citric acid, lactic acid, oxalic acid and tartaric acid, more preferably the acid is 5 to 15% (w/w) of citric acid and/or lactic acid.

DESCRIPTION OF EMBODIMENTS

Methods, Equipment, Chemicals and Recipes
Equipment Used in the Experiments:
The pH was measured using pHenomenal pH1000H from VWR with Hamilton Polilyte Lab Temp BNC electrode (calibrated with buffers pH 4, 7 and 10).
Particle charge was measured using Mütek PCD 02 device.
Stirring of formulations and pulp suspensions were done with overhead stirrer from IKA (either Eurostar digital IKA-Werke or IKA RW28 basic) together with a propeller shaft.
Homogenization of formulations was done using IKA T25 digital Ultra-Turrax.
Coating of materials was performed with a bench coater using a steel rod (called "coater") or Wichelhaus WI-MU 505 A horizontal padder (called "padder").
Weighing was done using XT 220A Precisa swissmade balance.

METHODS

Method 1—Solid Content (SC)

5 grams of powder or 10 grams of formulation was put in an aluminium cup and placed in oven at 105° C. over night. The solid content was then calculated using eq (4).

$$SC = (W_2 - W_0)/W_1 \quad (4)$$

where $W_0$=weight of the cup,
$W_1$=Weight of the original sample and
$W_2$=Weight of the cup and the final sample.

Method 2—Charge Density and Charge Ratio

Charge density was measured using the Mütek PCD 02 device. Charge (symbol: q, unit: meqv) was calculated using eq (1).

$$q[\text{meqv}] = C_{counter\ ion}[\text{eqv/l}] \cdot V_{counter\ ion}[\text{l}] \cdot 1000 \quad (1)$$

where the counter ion is one of sodium polyethylenesulphate (PES-Na, anionic) or poly-diallyl-dimethyl-ammonium-chloride (poly-dadmac, cationic), depending on the charge of the colloid. If the charge at different concentrations are plotted against mass of the current colloid, the charge density (unit: meqv/g) is the slope of the linear curve. The mass of the colloid can be calculated using eq (2).

$$m[\text{g colloid}] = \text{wt \% colloid} \left[ \frac{\text{g colloid}}{\text{g solution}} \right] \cdot \text{g[g solution } f\ o\ 10\ \text{ml]} \cdot 0.01 \quad (2)$$

All charge densities are calculated on totally dry matter. When the charge densities are known for one polycation (eg. cationic starch) and one polyanion (eg. carboxymethyl cellulose), the charge ratio is calculated between the polyelectrolytes so that the overall charge of the complex becomes positive (i.e. charge ratio<1), see eq (3).

$$\text{Charge ratio} = \frac{[\text{part of complex} \cdot \text{charge density}]\ \text{polyanion}}{[\text{part of complex} \cdot \text{charge density}]\ \text{polycation}} \quad (3)$$

Method 3—Preparation of Formulations

Cationic starch was dissolved in water using a homogenizer at 60-70° C. in the presence of a biocide or used as pre-cooked starch concentrate. CMC was added to the dissolved cationic starch and dissolved using homogenization. If additives were used, they were added and mixed in in the last step.

Method 4—Coating of Paper by Roll

Compositions were added to sheets of the material manually using a cylindrical steel rod. The treated papers were dried in an oven at 150° C. for 2-3 min.

Method 5—KIT Test/T 599 pm-96

Grease resistance test for paper and paperboard was measured according to T 599 pm-96, where the ranking is between 1 (bad barrier) and 12 (best possible barrier).

Method 6—COBB Method/ISO 536:191 (E)

Determination of water absorption during 60 seconds ($COBB_{60}$) or 1800 seconds ($COBB_{1800}$) was measured according to ISO 536:191 (E)

Method 7—Impregnation of Paper Using Padder

Formulation was poured between the rolls in the padder and the pressure was set to 0.1 MPa and speed to 11.6 rpm. The treated paper was dried at 150° C. for 2-3 min.

Method 8—Spray Test

Determination of resistance to surface wetting (spray test) of fabrics: European Standard EN 24 920 (ISO 4920:1981). Principle: A specified amount of water is sprayed on a textile specimen mounted on a ring. The specimen is disposed at an angle of 45° in respect to the nozzle. The centre of the standardized nozzle is disposed at a given distance above the center of the specimen. A given amount of water is filled in a reservoir disposed above the nozzle and in communication with it. The spray rating is determined visually and/or photographically. The stepwise spray rating scale of ISO 1-5 corresponds to 50-100% of the specimen having withstood wetting.

Chemicals, Materials and Compositions:

Chemicals used in the experiments are listed in table 1 and 2.

TABLE 1

Used polymers

| Chemical | Trade name | Solid content according to Method 1 | Charge density according to Method 2 | Supplier or distributor |
|---|---|---|---|---|
| Na Carboxymethyl cellulose (CMC) | FinnFix 5 | 87% | 3.78 | CP Kelco |
| Cationic starch (CS) | Emfloc KCG 750 | 22% | 2.57 | Emsland |
| Cationic starch (CS) | Emfloc ECG 750 | 22% | 2.84 | Emsland |
| Cationic starch (CS) | Solcore 134 P | 85% | 1.78 | Solam |
| Cationic starch (CS) | Solbond PC 170 MD | 85% | 1.68 | Solam |
| Cationic starch (CS) | Solbond PC 170 MP | 87% | 1.65 | Solam |
| Cationic starch (CS) | Hi-Cat 1574A | 86% | 1.08 | Roquette |
| Cationic starch (CS) | Vector SCA 2015 | 18% | 1.82 | Roquette |

TABLE 2

Used chemicals

| Chemical | Trade name | Supplier |
|---|---|---|
| Citric acid monohydrate | — | Univar |
| Sodium tribasic citrate, dihydrate | — | Univar |
| Lactic acid (80%) | Galactic Food 80 | Galactic S.A |
| Sodium hydrogen carbonate | — | Fisher Chemicals |
| Potassium carbonate anhydrous | Potassium carbonate anhydrous, reagent grade | Fisher Chemicals |
| Potassium hydroxide (46%) | Kalilut 46% | Evonic industries/Brenntag Nordic |
| Sorbitol (70%) | Plastilys (70%) | Roquette |
| Biobased binder | OC-Biobinder 5401 | OrganoClick AB |
| Silicone emulsion | OrganoTex 310 | OrganoClick AB |
| Silicone emulsion | Orga noTex 303 | OrganoClick AB |
| Emulsion of blocked isocyanates | Phobol XAN | Huntsmann |

Papers and paper boards used in the experiments are listed in table 3 and 4.

TABLE 3

Paper types

| | Unit | Paper type 1 | Paper type 2 | Molded pulp |
|---|---|---|---|---|
| Grammage | g/m2 | 40 | 55 | 400 |
| Thickness | μm | 55 | 72 | 1500 |

TABLE 4

Paper board types

| | Unit | Paper board type 1 | Paper board type 2 |
|---|---|---|---|
| Grammage | g/m2 | 330 | 260 |

Compositions used in the experiments are listed in Table 5. Percent weight of the biopolymers in the compositions of Table 5 is calculated by considering their solid content in Table 1. It should also be noted in Table 5 whenever CS and CMC were used alone as references, the recipes were based on 10-15 wt % biopolymers dissolved in tap water with a small amount of biocide.

TABLE 5

Compositions used in the examples

| Composition number # | FinnFix 5 | Solbond PC 170 MP | Hi-Cat 1574 A | Vector SCA 2015 | Emfloc ECG 750 | Emfloc KCG 750 | Solcore 134 P |
|---|---|---|---|---|---|---|---|
| 1 | 2.63 | 9.77 | | | | | |
| 2 | 2.63 | | 9.77 | | | | |
| 3 | 1.86 | | 10.54 | | | | |
| 4 | 1.86 | | | 47.43 | | | |
| 5 | 3.21 | | | 51 | | | |
| 6 | 4.2 | | | | | 39.7 | |
| 7 | 5.8 | | | | | 36.9 | |
| 8 | 3 | | | | | | 11.6 |
| 9 | 2.7 | | | | 56 | | |
| 10 | 3.8 | | | | 49.7 | | |
| 11 | 5.4 | | | | 35.5 | | |
| 12 | 3.21 | | | | 51 | | |
| 13 | 3.21 | | | | 51 | | |
| 14 | 3.8 | | | | | 40.9 | |
| 15 | 4.5 | | | | | 38.1 | |

TABLE 5-continued

Compositions used in the examples

| Composition number # | Citric acid mono hydrate | Sodium tri basic citrate di hydrate | Plastilys | Tap water | Nipacide BSM | Acticide AB6 | Sum | Charge ratio |
|---|---|---|---|---|---|---|---|---|
| 1  |    |   |       | 87.4  | 0.2 |      | 100 | 0.62 |
| 2  |    |   |       | 87.4  | 0.2 |      | 100 | 0.94 |
| 3  |    |   | 20    | 67.4  | 0.2 |      | 100 | 0.62 |
| 4  |    |   | 20    | 30.51 | 0.2 |      | 100 | 0.45 |
| 5  |    |   | 20    | 25.7  |     | 0.09 | 100 | 0.73 |
| 6  |    |   |       | 56.01 |     | 0.09 | 100 | 0.64 |
| 7  |    |   |       | 57.21 |     | 0.09 | 100 | 0.95 |
| 8  |    |   |       | 85.31 |     | 0.09 | 100 | 0.55 |
| 9  |    |   |       | 41.21 |     | 0.09 | 100 | 0.56 |
| 10 |    |   |       | 46.49 |     | 0.01 | 100 | 0.88 |
| 11 |    |   | 8.9   | 50.1  |     | 0.09 | 100 | 1.76 |
| 12 | 5  | 5 | 14.29 | 21.41 |     | 0.09 | 100 | 0.73 |
| 13 | 10 |   | 14.29 | 21.41 |     | 0.09 | 100 | 0.73 |
| 14 |    |   |       | 55.3  |     | 0.09 | 100 | 0.62 |
| 15 |    |   |       | 57.4  |     | 0.09 | 100 | 0.79 |

EXAMPLES OF THE INVENTION

Example 1. Comparative Barrier Performance Test of Only Biopolymers Compared to PEC In order to elucidate if cationic starch and carboxy methyl cellulose respectively give rise to barrier properties and how these perform in contrast to when they are combined to a PEC, the following test was performed. Paper type 2 was coated according to method 4. Two layers were applied and the results are shown in table 6.

TABLE 6

Comparison of PEC compositions 6 and 8 with their respective constituents

|  | KIT no layer 1 | Dry uptake layer 1 g/m2 | KIT no layer 2 | Dry uptake layer 2 g/m2 |
|---|---|---|---|---|
| CMC* | 4 | 2.7 | 8 | 9.8 |
| CS Solcore 134P* | 1 | 3.7 | 5 | 12.8 |
| Composition 8 | 1 | 7.2 | 11 | 14.2 |
| CS Emfloc ECG 750* | 1 | 3.8 | 1 | 11.2 |
| Composition 6 | 1 | 4.3 | 11 | 9.2 |

*Compositions prepared as water solutions with the respective biopolymer in 10-13 wt %, 0.09 wt % Acticide AB6 and topped up with tap water.

Example 2. Importance of Number of Layers

Paper type 2 was coated with composition 8 according to method 4 with either one layer and high add-on, or two layers with either 12.5 g/m2 or 14.2 g/m2, see table 7.

TABLE 7

KIT values measured on papers treated with different add-on applied in one or two layers

| Recipe | Add-on (g/m2) | Number of layers | KIT no |
|---|---|---|---|
| Composition 8 | 12.5 | 2 | 7 |
|  | 14.2 | 2 | 11 |
|  | 20.0 | 1 | 5 |

The results highlight not only that the performance is dependent on the add-on but also that addition of two layers with sufficient add-on is highly beneficial for achieving high grease resistance represented by the KIT numbers as compared to one layer.

Example 3. Application of PEC Compositions with Different Charges

Since a PEC can have different charges, it was decided to evaluate what effect these have on the grease resistance, see table 8. Two layers of the respective compositions were applied to paper type 2 using method 4. KIT-values were thereafter recorded using method 5.

TABLE 8

PEC compositions with different charges

| Recipe | Number of layers | Charge of PEC | Dry uptake (g/m2) | KIT no |
|---|---|---|---|---|
| Composition 9 | 2 | Cationic | 13.7 | 7 |
| Composition 10 | 2 | Neutral (close to neutral)/anionic | 10.6 | 11 |
| Composition 6 | 2 | Cationic | 9.8 | 11 |
| Composition 7 | 2 | Neutral/anionic | 11.9 | 9 |
| Composition 14 | 2 | Cationic | 12.2 | 7 |
| Composition 15 | 2 | Neutral/anionic | 15.9 | 11 |

The results show that high grease barriers can be achieved with PEC compositions of different charges.

Example 4. Combination of Different PEC Composition Layers

Some compositions containing cationic starch create a sticky/tacky surface on the treated material, sometimes this is wanted sometimes not. In this example, it is demonstrated how one can choose different compositions on the first and second layer to reduce stickiness, and improve KIT and/or COBB values. Application method 4 was used on paper type 2. Results are seen in table 9. A commercial binder called OC-Biobinder 5401 with more hydrophobic character was chosen to be combined with composition 1 of the invention.

TABLE 9

KIT, COBB and observations of the surface stickiness after application of barrier materials

| | KIT no | COBB60 | Observations |
|---|---|---|---|
| Paper type 2 | | | |
| Composition 1 | 5 | 55 * | Very sticky |
| 5401 | 1 | 80 | Not sticky |
| Layer 1: Composition 1, Layer 2: 5401 | 11 | 77 | Not sticky |
| Layer 1: 5401, Layer 2: Composition 1 | 5 | 39 | Very sticky |
| Paper type 1 | | | |
| Composition 1 | 9 | 33 * | Very sticky |
| 5401 | 0 | 80 | Not sticky |
| Layer 1: Composition 1, Layer 2: 5401 | 11 | 53 | Not sticky |
| Layer 1: 5401, Layer 2: Composition 1 | 11 | 37 | Very sticky |

* sheet is very sticky and film is swelled in contact with water which affects the result It can be concluded that the order of application has an impact on the stickiness/tackiness, COBB and KIT values of the treated material. One can choose the order of addition depending on the wanted material characteristics.

Example 5. Effect of Adding a Plasticizer on KIT and COBB Values

Carbohydrate based polymers are known to be stiff in their structure and hence the hand feel and the appearance of the treated material is expected to be stiff. In order to improve the folding properties of the treated material, reduce stiffness, reduce wrinkles of the dried paper and increase softness of the barrier coating, a common bio-based plasticizer was used and the amount optimized, see table 10. Paper type 2 was coated with the given compositions in table 10 using method 4.

TABLE 10

KIT and COBB values after addition of sorbitol to PEC compositions

| Composition | Sorbitol (wt %)* | Add on g/m2 | KIT no | COBB60 | Layers |
|---|---|---|---|---|---|
| Composition 6 | 0 | 9.2 | 11 | 39 | 2 |
| Composition 6 + 10 wt % sorbitol | 10 | 22.8 | 12 | Measured Directly: 32 Measured after 24 h: 6 | 2 |
| Layer 1: Composition 7 Layer 2: Composition 6 + 10 wt % sorbitol | 10 | 14.6 | 12 | Measured directly: 39 72 h: 30 | 2 |

*Amount sorbitol added to original PEC formulation (wt %)

Besides having a softening effect on the barrier coating it was seen that a certain amount of sorbitol has a positive influence on the KIT and COBB values of the treated material.

Example 6. Effect of Different pH on the Barrier Properties

A test was performed using pH adjusters as additives (acids and bases) to see if stickiness could be controlled while still maintaining KIT barrier properties. Paper grade 2 was coated using method 4, with 2 layers, see table 11.

TABLE 11

KIT and COBB values after pH adjustments of PEC compositions

| Recipe | pH | KIT no | COBB$_{60}$ | Observations |
|---|---|---|---|---|
| Composition 6 | 5.5 | 11 | 38.5 | Sticky |
| Composition 6 + 2 wt-% citric acid monohydrate | 3 | 11 | 46.5 | Much less sticky |
| Composition 6 + NaHCO3 | 8.5 | 10 | * | More sticky |
| Composition 6 + KOH (pH adjusted with a 46 wt % solution of KOH to pH 8.5) | 8.5 | 10 | * | More sticky |

* COBB$_{60}$ not possible to measure due to stickiness.

It can be seen that the papers treated with a formulation which has been adjusted to lower pH compared to the parent composition were much less sticky in relation to compositions that have been adjusted to higher pH as compared to the parent composition pH. Stickiness is a feature that in some cases is important for example in heat sealing processes.

Another observation that was made when adding citric acid monohydrate to composition 6 was that the dilutability became much better in the meaning that the PEC composition did not form big precipitates when water was added to the formulation.

Example 7. Plasticized and pH Adjusted Compositions on Different Cellulose Based Materials In a further example, combinations between plasticizer and pH adjustment additives were investigated. Compositions 12 and 13 were evaluated on paper type 2, molded pulp paper and paper board type 1 and 2. All materials were coated using method 4 with two layers of the compositions.

TABLE 12

Barrier properties on several materials for pH adjusted and plasticized PEC compositions.

| Material | Layer 1 | Layer 2 | KIT no | COBB$_{60}$ | Comment |
|---|---|---|---|---|---|
| Paper type 2 | Composition 12 | Composition 13 | 12 | 35 | |
| Molded pulp paper | — | — | 0 | 244 | Reference |
| Molded pulp paper | Composition 12 | Composition 12 | 10 | 50 | |

TABLE 12-continued

Barrier properties on several materials for pH adjusted and plasticized PEC compositions.

| Material | Layer 1 | Layer 2 | KIT no | COBB$_{60}$ | Comment |
|---|---|---|---|---|---|
| Molded pulp paper | Composition 12 | Composition 13 | 11 | 33 | |
| Paper board type 1 | — | — | 0 | 96* | Reference |
| Paper board type 1 | Composition 12 | Composition 12 | 12 | 102* | |
| Paper board type 1 | Composition 12 | Composition 13 | 12 | 96* | |
| Paper board type 1 | Composition 13 | Composition 12 | 12 | 103* | |
| Paper board type 2 | — | — | 0 | 103* | Reference |
| Paper board type 2 | Composition 12 | Composition 12 | 12 | 87* | |
| Paper board type 2 | Composition 12 | Composition 13 | 12 | 75* | |
| Paper board type 2 | Composition 13 | Composition 12 | 12 | 86* | |

*COBB$_{1800}$ was performed since the material was paperboard

The combination of PEC with plasticizer and pH adjustment additive yield very promising results in both COBB and KIT values and hence a good water and grease barrier on the coated materials. It is also clear that application of composition 12 yields a good grease barrier while composition 13 results in good water barrier and most importantly these coatings seem not to interfere with each other but work synergistically.

Example 8. Combination of PEC and Non-PEC Coatings on Various Materials

To further extend the usage of the invention, textile material was coated. A white polyester fabric with a grammage of 150 g/m2 was coated according to method 4 with PEC compositions 1 and 2 respectively and subsequently further coated using method 7 using commercially available hydrofobizing products OC-aquasil Tex 310 or OC-aquasil Tex 303. Results are presented in the table 13.

TABLE 13

Polyester fabric coated with compositions

| 1st and 2nd layer | 3rd layer | Spray score | KIT no |
|---|---|---|---|
| Composition 1 and Composition 2 | OrganoTex 310 | -2- Proof | 5-6 |
| Composition 1 and Composition 2 | Tex 303 + 10% XAN | +3 Proof | 7 |

It can be concluded that the current invention is also capable of creating a good barrier for water and grease on textile which is of much lower density compared to for example paper.

The invention claimed is:

1. A fibre-based material with a barrier coating against oil and water, said barrier coating comprising at least two layers formed from at least one composition comprising a polyelectrolyte complex (PEC) of a cationic biopolymer and an anionic biopolymer and a pH-adjuster comprising a buffering system with an acid and a base, wherein the first layer is made from a composition with a first pH value and the second layer is made from a composition having a second pH value different from the first pH value of the first composition, and wherein the two layers result in improvements in both oil resistance and water resistance compared to the same material provided with a single layer of said at least one composition.

2. The material according to claim 1, wherein the cationic biopolymer is selected from cationic starch (CS) and chitosan, and the anionic biopolymer is selected from at least one of lignin alkali, lignosulfonic acid, and a polysaccharide.

3. The material according to claim 2, wherein the polysaccharide comprises at least one of sodium carboxymethyl cellulose (CMC), alginic acid, pectin, carrageenan, gum arabic, hemicellulose, and nanocrystalline cellulose (NCC).

4. The material according to claim 2, wherein the two layers are formed from two compositions comprising a polyelectrolyte complex (PEC) of CS and CMC.

5. The method according to claim 4, wherein the two compositions comprise from 0.1 to 20% (w/w) of CMC and from 0.1 to 20% of CS.

6. The method according to claim 4, wherein the two compositions comprise from 0.5 to 10% (w/w) of CMC and from 0.5 to 20% of CS.

7. The material according to claim 4, wherein the two compositions comprises PECs with the same relative amounts of CS and CMC.

8. The material according to claim 4, wherein the composition for making the first layer comprises 5 to 20% (w/w) of CS, 1 to 5% (w/w) of CMC, and 1 to 15% (w/w) of a buffering system consisting of an acid and base pair providing the composition with a pH of 3 to 6.

9. The material according to claim 4, wherein the composition for making the second layer comprises 5 to 20% (w/w) of CS, 1 to 5% (w/w) of CMC, and an organic or inorganic acid present in an amount of 0.01 to 30% (w/w) providing the composition with a pH of 1 to 3.

10. The material according to claim 1, wherein the buffering system provides 0.01 to 30% (w/w) of a corresponding acid and a base pair admitting a pH from 2 to 9 to the composition.

11. The material according to claim 1, wherein at least one of the layer-forming compositions comprises a plasticizer, wherein the plasticizer is a polyol type plasticizer.

12. The material according to claim 1, wherein the barrier has KIT value of 5 or more, as measured according to T 999 pm-96 and a COBB60 value of 50 or less, as measured according to ISO 536: 191(E).

13. The material according claim 1, wherein said first layer is an inner layer of the barrier and said second layer is an outer layer of the barrier.

14. The material according to claim 1, wherein the first composition for making the first layer has a higher pH than the second composition for making the second layer.

15. A method of manufacturing the material according to claim 1, comprising the steps of:
applying a first layer to the material with the first composition comprising a polyelectrolyte complex (PEC) of a cationic biopolymer and an anionic biopolymer;
optionally drying the material at a temperature between 15 and 90° C.;
applying a second layer to the first layer with the second composition; and curing the material at a temperature between 15 and 90° C.

16. The method according to claim 15, wherein curing is performed at 20° C. to 200° C.

17. The method according to claim 15, wherein the first composition has a higher pH than the second composition.

* * * * *

UNITED STATES PATENT AND TRADEMARK OFFICE
CERTIFICATE OF CORRECTION

PATENT NO. : 12,163,291 B2
APPLICATION NO. : 17/762110
DATED : December 10, 2024
INVENTOR(S) : Juhanes Aydin et al.

Page 1 of 1

It is certified that error appears in the above-identified patent and that said Letters Patent is hereby corrected as shown below:

In the Claims

Claim 5, Column 16, Line 25, change "method" to -- material --.

Claim 6, Column 16, Line 28, change "method" to -- material --.

Signed and Sealed this
Fourth Day of February, 2025

Coke Morgan Stewart
*Acting Director of the United States Patent and Trademark Office*